United States Patent
Felcmann

(10) Patent No.: US 11,316,338 B2
(45) Date of Patent: Apr. 26, 2022

(54) DEVICE FOR SUPPLYING ENERGY TO AT LEAST ONE LOAD IN A POTENTIALLY EXPLOSIVE ATMOSPHERE

(71) Applicant: Endress+Hauser Conducta GmbH+Co. KG, Gerlingen (DE)

(72) Inventor: Christian Felcmann, Muehlacker (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 241 days.

(21) Appl. No.: 16/670,377

(22) Filed: Oct. 31, 2019

(65) Prior Publication Data

US 2020/0136376 A1   Apr. 30, 2020

(30) Foreign Application Priority Data

Oct. 31, 2018   (DE) ...................... 10 2018 127 196.4

(51) Int. Cl.
| | |
|---|---|
| *H02H 9/00* | (2006.01) |
| *H02H 9/04* | (2006.01) |
| *H02H 9/02* | (2006.01) |
| *G05B 9/02* | (2006.01) |

(52) U.S. Cl.
CPC ............... *H02H 9/008* (2013.01); *G05B 9/02* (2013.01); *H02H 9/02* (2013.01); *H02H 9/04* (2013.01)

(58) Field of Classification Search
CPC . H02H 9/02; H02H 9/04; H02H 9/008; G05B 9/02
USPC .......................................................... 361/58
See application file for complete search history.

(56) References Cited

U.S. PATENT DOCUMENTS

| 7,057,577 B1* | 6/2006 | Willoughby ........... H01Q 1/002 343/872 |
| 9,512,993 B2* | 12/2016 | Burmeister ............. F21V 21/35 |
| 2002/0065631 A1* | 5/2002 | Loechner ........... G05B 19/4185 702/188 |

(Continued)

FOREIGN PATENT DOCUMENTS

| DE | 102014117179 A1 | 5/2016 |
| DE | 2016 106 798 | * 10/2017 |

(Continued)

*Primary Examiner* — Jared Fureman
*Assistant Examiner* — Lucy M Thomas
(74) *Attorney, Agent, or Firm* — Christopher R. Powers; Endress+Hauser (USA) Holding Inc.

(57) ABSTRACT

The present disclosure relates to a device for supplying energy to at least one intrinsically safe load in a potentially explosive area, the device including: a housing with an electrical input and with at least one electrical output, the housing is encapsulated in a pressure-proof manner, the electrical input encapsulated in a pressure-proof manner, and the at least one electrical output being intrinsically safe; an ignition protection module arranged in the housing and electrically connected to the electrical input and to the at least one electrical output, wherein the ignition protection module converts an electrical voltage present at the electrical input into an intrinsically safe electrical voltage and provides it at least one electrical output there, wherein the ignition protection module converts an electrical current present at the electrical input into an intrinsically safe electrical current and provides it at the at least one electrical output there.

10 Claims, 1 Drawing Sheet

(56) References Cited

U.S. PATENT DOCUMENTS

2016/0072278 A1\* 3/2016 Kollmer .................. H02H 9/02
  361/93.2
2016/0234466 A1\* 8/2016 Pool .................. G02B 23/2492

FOREIGN PATENT DOCUMENTS

DE   102016106798  A1   10/2017
DE   102017115259  A1   1/2019

\* cited by examiner

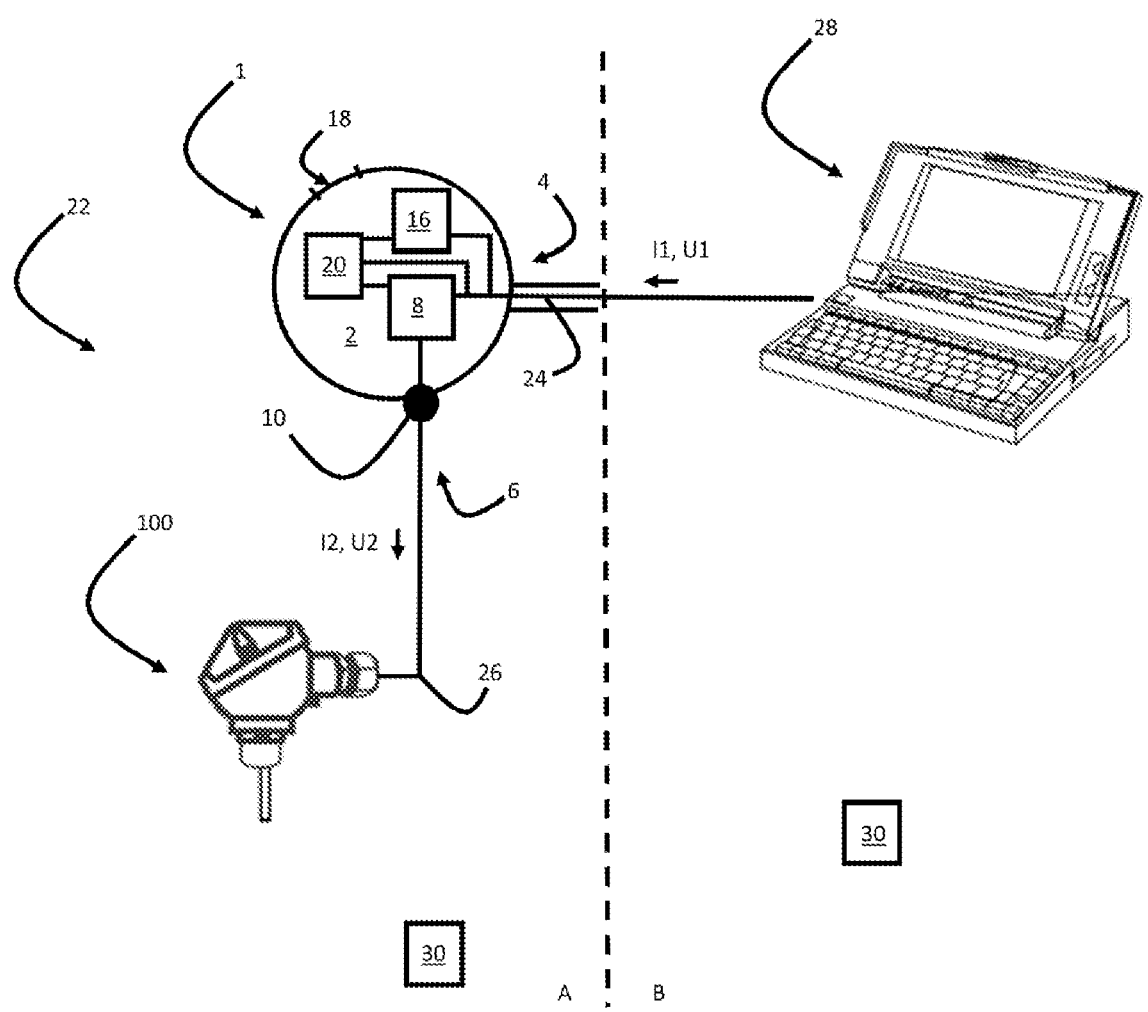

DEVICE FOR SUPPLYING ENERGY TO AT LEAST ONE LOAD IN A POTENTIALLY EXPLOSIVE ATMOSPHERE

CROSS-REFERENCE TO RELATED APPLICATION

The present application is related to and claims the priority benefit of German Patent Application No. 10 2018 127 196.4, filed on Oct. 31, 2018, the entire contents of which are incorporated herein by reference.

TECHNICAL FIELD

The present disclosure relates to a device for supplying energy to at least one load in a potentially explosive atmosphere.

BACKGROUND

In the field of process analysis in potentially explosive atmospheres, field devices and other energy loads, users or consumers (for example, sensors) are used to measure various parameters of, for example, a chemical process. Since such devices are operated in a potentially explosive environment, they must comply with certain regulations regarding the prevention of explosions. More precisely, such devices must have a so-called "ignition protection type," which makes the ignition of an explosive gas mixture or powder mixture impossible.

A well-known ignition protection type is the pressure-proof encapsulation of a load in a housing that can withstand explosive pressure inside the housing. An alternative ignition protection type is the so-called "intrinsically safe" design of the load. This means that the load is designed in such a way that current, voltage, power and temperature are limited so that the minimum ignition energy of an explosive mixture surrounding the load is not reached.

When designing a system for carrying out a process, the designer of the system usually selects only one ignition protection type for the loads and electrical cables used in the system. However, if the designer opts for the pressure-proof encapsulation of the loads and cables being used, the use of loads of a different ignition protection type will be made more difficult. This leads to a severe restriction in the selection of new loads if existing loads are to be replaced or the system is to be extended to include additional loads.

SUMMARY

One object of the present disclosure is thus to provide a device that makes it possible to use electrical devices of an ignition protection type different from the ignition protection type used in the system.

Such object is achieved by the device according to claim 1.

A device according to the present disclosure for supplying energy to at least one intrinsically safe load in a potentially explosive atmosphere comprises a housing with one electrical input and at least one electrical output. The housing is encapsulated in a pressure-proof manner, the electrical input is encapsulated in a pressure-proof manner and the at least one electrical output is intrinsically safe. The device also includes an ignition protection module arranged in the housing and is electrically connected to the electrical input and at least one electrical output. The ignition protection module is capable of converting an electrical voltage present at the electrical input into an intrinsically safe electrical voltage and providing it to the at least one electrical output. The ignition protection module is capable of converting an electrical current arriving at the electrical input into an intrinsically safe electrical current and providing it to the at least one electrical output. The at least one electrical output has an electrical connection capable of being connected to the at least one intrinsically safe load.

An advantage of the housing encapsulated in a pressure-proof manner is that the device can be used in potentially explosive atmospheres. The electrical input encapsulated in a pressure-proof manner allows electrical input lines encapsulated in a pressure-proof manner to be connected to the device. Such electrical input lines encapsulated in a pressure-proof manner are, for example, already available to the user. The intrinsically safe electrical output allows intrinsically safe output lines to be connected to the device. This means that an intrinsically safe load can be retrofitted or replaced in a potentially explosive atmosphere in which until then only ignition protection devices of the category of pressure-proof encapsulation have been used. The device thus enables a user to supplement or replace a device assembly encapsulated in a pressure-proof manner with intrinsically safe devices. The device also makes it possible to reduce additional certification costs concerning government agencies.

Advantageous embodiments are listed in the dependent claims.

According to one embodiment of the present disclosure, the electrical connection is disconnectable.

According to one embodiment of the present disclosure, the electrical connection is a plug-in connection, a clamping connection or a screw connection.

According to one embodiment of the present disclosure, the device further comprises a display unit arranged in the housing and the housing further comprises a transparent section.

According to one embodiment of the present disclosure, the device further comprises a communication module arranged in the housing and capable of transmitting and receiving data.

According to one embodiment of the present disclosure, the communication module is capable of transmitting and/or receiving data via Bluetooth or WLAN or other wireless transmission methods.

The object according to the present disclosure is also achieved by a module according to claim 7.

The module according to the present disclosure for supplying energy to at least one intrinsically safe load in a potentially explosive atmosphere comprises a device according to the present disclosure, an electrical input line and at least one electrical output line. The electrical input line is encapsulated in a pressure-proof manner and the at least one electrical output line is intrinsically safe.

According to one embodiment of the present disclosure, the electrical output line is detachably connected to the electrical output via the electrical connection.

According to one embodiment of the present disclosure, at least one electrical output line has a length such that the intrinsic safety of the output line is guaranteed.

According to one embodiment of the present disclosure, the module also includes a mobile device capable of exchanging data with the communication module of the device, of evaluating data and of storing data.

BRIEF DESCRIPTION OF THE DRAWING

The present disclosure is explained in more detail on the basis of the following description of the FIGURE. The following is shown:

FIG. 1 shows a schematic representation of a module according to the present disclosure with a device according to the present disclosure for supplying energy to an intrinsically safe load.

DETAILED DESCRIPTION

FIG. 1 shows the device 1 according to the present disclosure for supplying energy to at least one intrinsically safe load 100 in a potentially explosive atmosphere A.

The device comprises a housing 2 having an electrical input 4 and at least one electrical output 6. The housing 2 is encapsulated in a pressure-proof manner. The electrical input 4 is encapsulated in a pressure-proof manner. The electrical output 6 is intrinsically safe. The housing 2 thus possesses an ignition protection type that makes use in a potentially explosive atmosphere A possible.

During operation, the device 1 is connected to a control module 28, which is located in a potentially explosive atmosphere B. The control module 28 is, for example, a control system or a control unit. The electrical connection between the device 1 and the control module 28 is established via an input line 24 encapsulated in a pressure-proof manner. As shown in FIG. 1, the input line 24 is encapsulated in a pressure-proof manner at least in the potentially explosive area A. In the potentially explosive atmosphere B, a pressure-proof encapsulation of the input line 24 is not necessary. The input line 24 is capable of exchanging data between the device 1 and the control module 28. For example, measurement data from an intrinsically safe load 100 connected to the device 1, for example a transmitter, a measuring instrument, or a field indicator, can be transmitted via the input line 24 to the control module 28. Control data can also be sent from the control module 28 to the device 1 via the input line 24. The input line 24 is also capable of supplying energy to the device 1.

The device 1 is suitable for being located in the potentially explosive atmosphere A and being connected to the intrinsically safe load 100, which is likewise located in the potentially explosive atmosphere A. The connection between the device 1 and the intrinsically safe load 100 is established via an intrinsically safe output line 26. Control data can also be sent to the intrinsically safe load 100 from the control module 28 via the input line 24, via the device 1 and via the intrinsically safe output line 26.

The electrical output 6 has an electrical connection 10 that is capable of being detachably connected to at least one intrinsically safe load 100. Thanks to the electrical connection, any intrinsically safe load 100 can be connected to the device 1. A detachable connection between the device 1 and the load 100 is thus established via the connection 10 and the intrinsically safe output line 26.

The electrical connection 10 takes the form of, for example, a clamp connection, a plug-in connection or a screw connection. This makes possible a rapid connection of the intrinsically safe output line 26 using standard tools or without tools.

The intrinsically safe output line 26 is connected to the electrical output 6 of the device 1. More precisely, the intrinsically safe output line 26 is connected to the intrinsically safe electrical connection 10. The intrinsically safe output line 26 has a line cross-section of at least 1 mm$^2$. In addition, the intrinsically safe output line 26 is insulated in light blue insulation. Other line cross-sections and/or insulation colors of the output line and the other lines can be selected according to country-specific regulations and/or standards.

The output line 26 can be of any length, provided the intrinsic safety of the output line 26 is guaranteed. The output line 26, for example, is between 0.001 m and 2000 m long. The output line 26 can also be longer than 2000 m, as long as the intrinsic safety of the device 1 is provided. This makes it possible for the output line 26 to be used universally for loads that are more intrinsically safe.

The input line 24 of the device 1, the device 1 and the output line 26 of the device 1 together form a module 22 for supplying energy to at least one intrinsically safe load 100.

The device 1 comprises an ignition protection module 8, which is arranged in the housing 2. The ignition protection module 8 is used to prevent ignition in electrical circuits installed in an explosive atmosphere. The ignition protection module 8 prevents the penetration of ignitable energy. The ignition protection module 8 can transmit a voltage as supply and/or a communication signal from an intrinsically non-safe area B to an intrinsically safe area A and/or makes a supply voltage available to a load 100 in the intrinsically safe area A. The ignition protection module 8 is, for example, a supply isolator, an isolation amplifier or an intrinsically safe barrier, such as isolation barriers or Zener barriers.

The ignition protection module 8 is electrically connected to the input 4 encapsulated in a pressure-proof manner and at least one intrinsically safe electrical output 6. The ignition protection module 8 is capable of converting an electrical voltage U1 present at the electrical input 4 into an intrinsically safe electrical voltage U2 and of providing at least one electrical output 6 there. The ignition protection module 8 is also capable of converting an electrical current I1 present at the electrical input 4 into an intrinsically safe electrical current I2 and of providing at least one electrical output 6 there.

The device 1 also has a display unit 16, which is arranged in the housing 2. The display unit 16 enables the display of measured values that are transmitted from a load, for example a transmitter, to the device 1. Due to the display unit 16, it is possible to display process values or other data of the device to a user locally, e.g., directly at the device. In addition, the display unit 16 enables the display of status messages of the device 1, error messages of the device 1 or other additional information.

The display unit 16 is also capable of displaying the non-intrinsically safe voltage U1, the non-intrinsically safe current I1, the intrinsically safe voltage U2 and the intrinsically safe current I2 (see FIG. 1). The housing 2 preferably has a transparent area 18 that is arranged in such a manner that the display unit 16 is visible from outside the housing 2.

The device 1 also has a communication module 20, which is arranged in the housing 2. The communication module 20 is electrically connected to the ignition protection module 8 and/or to the display unit 16 and/or the electrical input 4 encapsulated in a pressure-proof manner in order to receive data and/or transmit data. The communication module 20 is also configured to transmit or receive data wirelessly via Bluetooth, WLAN, near-field communication, GSM, VHF or other wireless transmission methods. This means that data can be exchanged with a mobile device 30, for example a smartphone or a mobile device approved for use in the potentially explosive area A, or a higher-level system. The mobile device 30 is capable of wirelessly exchanging data with the communication module 20 of the device 1, evaluating data and storing data.

A communication module 20 with wireless data transmission make possible a convenient data exchange with a mobile device 30, even when device 1 is positioned at locations that are difficult to reach. An additional advantage of a communication module 20 with wireless data transmission is that the paths of energy supply to and of communication with the device 1 are physically separated.

In an alternative embodiment not shown, the device 1 has more than one intrinsically safe electrical output 6. Each intrinsically safe electrical output 6 is electrically connected to the ignition protection module 8. A multiple number of loads 100 can thus be electrically connected to the device 1 via an individual output line 26 of the device 1, in order to exchange data with the device 1 and/or to be supplied with energy. In addition, the device 1 may have a multiple number of electrical inputs 4 encapsulated in a pressure-proof manner. In such a case, each electrical input 4 is assigned to an electrical output 6 in order to exchange data between the control module 28 and the various loads 100.

If the device 1 has a plurality of electrical inputs 4, a number of electrical inputs 4 can be used for supplying energy to the device 1, and a number of electrical inputs 4 can be used as a communication line.

In an alternative embodiment not shown, the device 1 has more than one electrical input 4. Preferably, the number of electrical inputs 4 of the device is identical to the number of electrical outputs 6 of the device. In this way, a plurality of loads 100 can be connected simultaneously to the device 1, in order to exchange data with the device 1 and/or to be supplied with energy.

In an alternative embodiment not shown, a power supply unit is used instead of the control unit 28 in order to ensure a pure supply of voltage and power to the device 1. In such a case, the power supply unit is not configured to exchange data with the device 1.

The invention claimed is:

1. A device for supplying energy to at least one intrinsically safe load in a potentially explosive environment, the device comprising:
    a housing including an electrical input and at least one electrical output, wherein the housing is encapsulated in a pressure-proof manner, the electrical input is encapsulated in a pressure-proof manner and the at least one electrical output is intrinsically safe; and
    an ignition protection module, which is disposed within the housing and is electrically connected to the electrical input and to the at least one electrical output,
    wherein the ignition protection module is configured to convert an electrical voltage present at the electrical input into an intrinsically safe electrical voltage and to provide the intrinsically safe electrical voltage to the at least one electrical output,
    wherein the ignition protection module is configured to convert an electrical current at the electrical input into an intrinsically safe electrical current and to provide the intrinsically safe electrical current to the at least one electrical output, and
    wherein the at least one electrical output has an electrical connection that is connectable to at least one intrinsically safe load.

2. The device of claim 1, wherein the electrical connection is also disconnectable.

3. The device of claim 1, wherein the electrical connection is a plug-in connection, a clamping connection or a screw connection.

4. The device of claim 1, wherein the device further has a display unit disposed within the housing, and the housing has a transparent area.

5. The device of claim 1, further comprising a communication module disposed within the housing and configured to transmit and receive data.

6. The device of claim 5, wherein the communication module is configured to transmit and/or receive data via Bluetooth or WLAN or other wireless transmission method.

7. A module for supplying energy to at least one intrinsically safe load in a potentially explosive environment, the module comprising:
    a device comprising:
        a housing including an electrical input and at least one electrical output, wherein the housing is encapsulated in a pressure-proof manner, the electrical input is encapsulated in a pressure-proof manner and the at least one electrical output is intrinsically safe; and
        an ignition protection module, which is disposed within the housing and is electrically connected to the electrical input and to the at least one electrical output,
        wherein the ignition protection module is configured to convert an electrical voltage present at the electrical input into an intrinsically safe electrical voltage and to provide the intrinsically safe electrical voltage to the at least one electrical output,
        wherein the ignition protection module is configured to convert an electrical current at the electrical input into an intrinsically safe electrical current and to provide the intrinsically safe electrical current to the at least one electrical output, and
        wherein the at least one electrical output has an electrical connection that is connectable to at least one intrinsically safe load;
    an electrical input line; and
    at least one electrical output line,
    wherein the electrical input line is encapsulated in a pressure-proof manner and the at least one electrical output line is intrinsically safe.

8. The module of claim 7, wherein the electrical output line is detachably connected to the electrical output via the electrical connection.

9. The module of claim 7, wherein the at least one electrical output line has a length such that the intrinsic safety of the output line is ensured.

10. The module of claim 7, wherein the device further comprises a communication module disposed within the housing and configured to transmit and receive data, and
    wherein the module further comprises a mobile device capable of exchanging data with the communication module of the device and of evaluating and storing data.

* * * * *